United States Patent [19]

Paul et al.

[11] Patent Number: 5,190,656

[45] Date of Patent: * Mar. 2, 1993

[54] METHOD FOR REMOVING SCALE VIA A LIQUID MEMBRANE IN COMBINATION WITH AN AMINO CARBOXYLIC ACID AND A CATALYST

[75] Inventors: James M. Paul, DeSoto; Richard L. Morris, Duncanville, both of Tex.

[73] Assignee: Mobil Oil Corporation, Fairfax, Va.

[*] Notice: The portion of the term of this patent subsequent to Jun. 25, 2008 has been disclaimed.

[21] Appl. No.: 742,565

[22] Filed: Aug. 7, 1991

Related U.S. Application Data

[63] Continuation of Ser. No. 459,120, Dec. 29, 1989, abandoned, which is a continuation-in-part of Ser. No. 332,147, Apr. 3, 1989, abandoned.

[51] Int. Cl.$^5$ .................. B01D 17/00; C02F 1/26; C02F 5/10
[52] U.S. Cl. ........................... 210/643; 210/698; 210/638; 252/80; 252/82; 252/180; 166/312
[58] Field of Search ............ 210/643, 698, 638; 166/312; 252/80, 82, 180

[56] References Cited

U.S. PATENT DOCUMENTS

| | | | |
|---|---|---|---|
| 3,264,138 | 8/1966 | Messalt | 252/80 |
| 3,671,447 | 6/1972 | Kowalski | 252/80 |
| 3,684,720 | 8/1972 | Richardson | 252/86 |
| 3,988,253 | 10/1976 | Tate | 252/80 |
| 4,215,000 | 7/1980 | DeJong et al. | 252/80 |
| 4,287,071 | 9/1981 | DiGiacomo | 210/643 |
| 4,553,343 | 11/1985 | Bauer et al. | 210/643 |
| 4,621,694 | 11/1986 | Wilson et al. | 166/312 |
| 4,640,793 | 2/1987 | Persinski et al. | 210/698 |
| 4,708,805 | 11/1987 | D'Muhala | 210/698 |
| 5,026,481 | 6/1991 | Paul et al. | 210/638 |
| 5,032,280 | 7/1991 | Paul et al. | 210/643 |

Primary Examiner—Jack Cooper
Assistant Examiner—J. M. Silbermann
Attorney, Agent, or Firm—A. J. McKillop; C. J. Speciale; C. A. Malone

[57] ABSTRACT

A liquid membrane method for removing scale deposits wherein a novel chelating composition is utilized. The composition used in the external and internal aqueous phases of said membrane comprises an aqueous solution having a pH of about 8 to about 14, and an aminocarboxylic acid or polyamine chelant. Additionally, a catalyst or synergist is used in the external phase only. Preferred chelants comprise diethylenetriamine pentaacetic acid (DTPA) or ethylenediaminetetraacetic acid (EDTA) or alkali salts thereof. Anions of organic and inorganic acids comprise the catalyst used in the external phase. Catalysts which can be used include fluoride, oxalate, persulfate, dithionate, hypochlorite, formate, thio, amino and hydroxy acetate anions. When the solution containing the composition is contacted with a surface containing a scale deposit, the deposit dissolves substantially more scale quicker than heretofore possible.

20 Claims, 9 Drawing Sheets

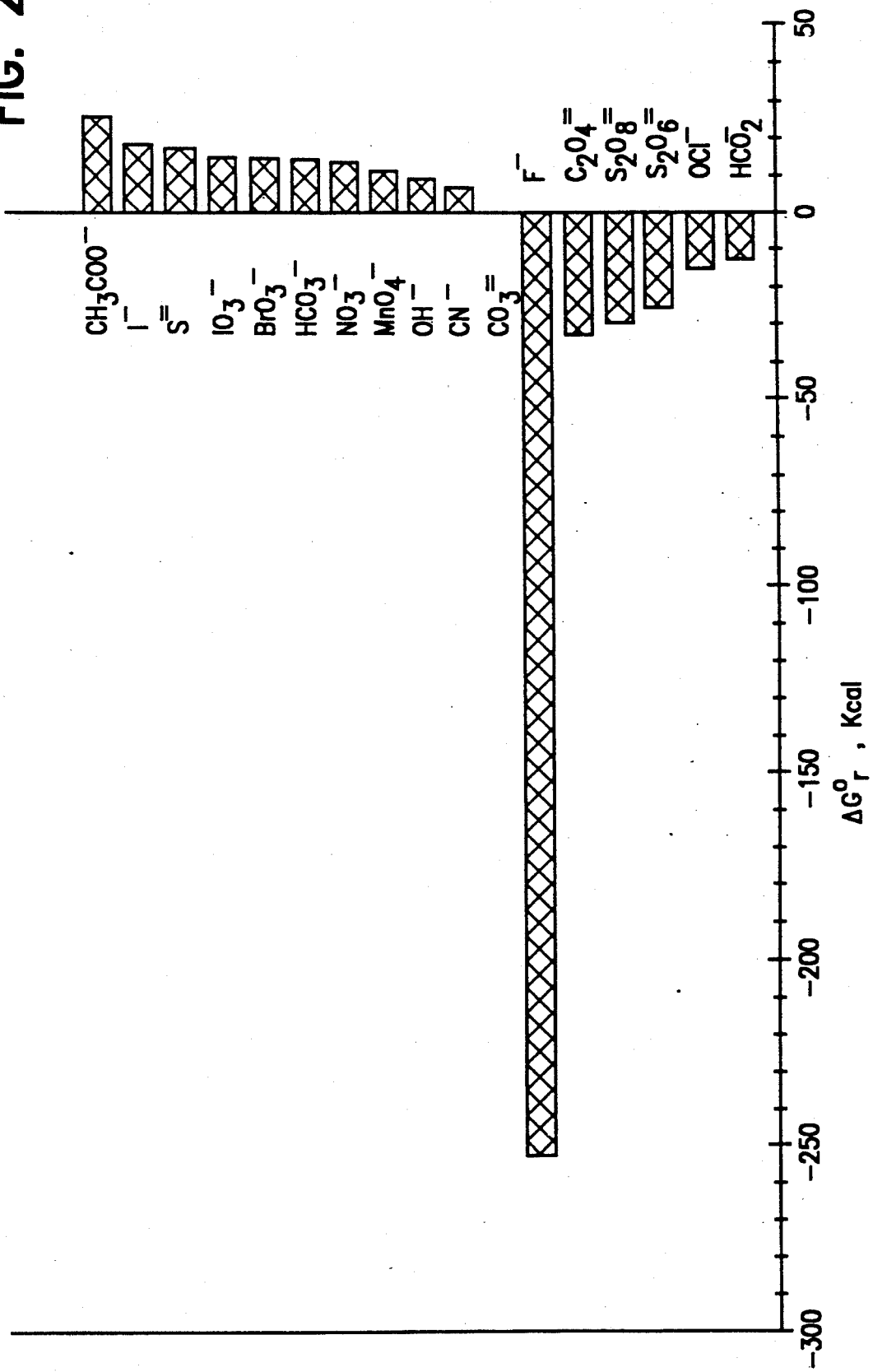

METHOD FOR REMOVING SCALE VIA A LIQUID MEMBRANE IN COMBINATION WITH AN AMINO CARBOXYLIC ACID AND A CATALYST

CROSS-REFERENCE TO RELATED APPLICATIONS

This is a continuation of copending application Ser. No. 07/459,120, filed on Dec. 29, 1989, which is a continuation-in-part of U.S. application Ser. No. 332,147, filed on Apr. 3, 1989, both now abandoned.

This application is related to application Ser. No. 07/493,165 that was filed on Mar. 14, 1990 now U.S. Pat. No. 5,026,481 that issued on Jun. 25, 1991. Additionally, this application is related to application Ser. No. 07/493,166 that was filed on Mar. 14, 1990 now U.S. Pat. No. 5,032,280 which issued on Jul. 16, 1991.

FIELD OF THE INVENTION

This invention is directed to a method for the removal of scale found in oil and gas production equipment which method utilizes liquid membrane systems that employ a novel composition.

BACKGROUND OF THE INVENTION

Most water contains alkaline earth metal cations, such as barium, strontium, calcium and magnesium, and anions, such as sulfate, bicarbonate, carbonate, oxalate, phosphate, silicate and fluoride. When combinations of these anions and cations are present in concentrations which exceed the solubility of their reaction products, precipitates form until their product solubility concentrations are no longer exceeded. For example, when the barium ion and sulfate ion exceed the solubility of the barium sulfate reaction product, a solid phase of barium sulfate will form as a precipitate.

Solubility product concentrations are exceeded for various reasons, such as evaporation of the water phase, change in pH, pressure or temperature and the introduction of additional common ions which can form insoluble compounds with the ions already present in the solution.

As these reaction products precipitate on the surfaces of the water-carrying or water-containing system, they form adherent deposits or scale. The scale prevents effective heat transfer, interferes with fluid flow, facilitates corrosive processes, and harbors bacteria. Scale is an expensive problem in many industrial water systems, in production systems for oil and gas, in pulp and paper mill systems, and in other systems, causing delays and shutdowns for cleaning and removal.

Once through and recirculating, cooling water systems are subject to the formation of scale deposits. Waterside problems encountered in boilers and steam systems include the formation of scale and other deposits, corrosion and foam. Scale and other deposits on heat-transfer surfaces can cause loss of the thermal efficiency of the boiler and can make the temperature of the boiler metal increase. Under scaling conditions, temperatures may go high enough to lead to failure of the metal due to overheating.

Barium and strontium sulfate scale deposits present a unique and sometimes "unsolvable" problem. Under most conditions, these sulfates are considerably less soluble in all solvents than any of the other commonly encountered scale-forming compounds. It is generally acknowledged that barium sulfate scale is almost impossible to remove economically by chemical means. Consequently, barium sulfate must be removed mechanically or the equipment, pipes, etc., containing the deposit must be discarded.

The incidence of barium sulfate scale is worldwide, and it occurs principally in systems handling subsurface waters. The barium sulfate scale problem is of particular concern to the petroleum industry since increasing volumes of water are produced with petroleum and more petroleum is produced by the waterflooding method of secondary recovery. The scale may occur in many different places, including production tubing, well bore perforations, the area near the well bore, gathering lines, meters, valves and in other production equipment.

Deposition of scale in tubing production facilities and formation channels is a well-known source of problems in oil recovery. Barium sulfate scale is particularly troublesome when sulfate-rich seawater is used as an injection fluid in earth formations whose formation water is rich in barium ions. This scale causes severe problems in U.S. oil fields and older North Sea oil fields. Scaling of this nature is expected to occur during advanced production stages in other North Sea fields particularly after seawater breakthrough has taken place.

Barium sulfate scale may also form within subterranean formations such as in disposal wells. Scales and deposits can be formed to such an extent that the permeability of the formation is impaired resulting in lower flow rates, higher pump pressures, and ultimately abandonment of the well.

U.S. Pat. No. 4,708,805, issued to D'Muhala on Nov. 24, 1987, discloses a process and compositions for the sequestration of barium sulfate scale. The compositions comprised an aqueous solution of citric acid, a polycarboxylic acid, and an alkylene-polyaminopolycarboxylic acid. The preferred aqueous sequestering solution had a pH in the range of about 9.5 to about 14. The pH was provided by a base selected from the group consisting of potassium hydroxide, potassium carbonate, and mixtures thereof. This patent is hereby incorporated by reference herein.

De Jong et al. in U.S. Pat. No. 4,190,462 disclose that barium sulfate scale can be removed from remote locations extending into a subterranean earth formation by contacting the scale with an aqueous solution consisting essentially of water, a monovalent cation salt of a monocyclic macroyclic polyamine containing at least two nitrogen-linked carboxymethyl groups and enough monovalent basic compound to provide a solution pH of about 8.

Wilson et al. in U.S. Pat. No. 4,621,694 disclose the use of a liquid membrane for scale removal. Chelating agents were utilized to remove scale-forming ions from an aqueous medium contacting the scale. Although chelating agents were used in the liquid membrane system, a catalyst was not used in conjunction with chelating agents to enhance the effectiveness of the system.

Therefore, what is needed is a liquid membrane system which uses chelating agents in combination with a catalyst to remove scale at a substantially increased rate and a high capacity.

SUMMARY OF THE INVENTION

This invention is directed to a liquid membrane process or technique for removing scale-forming ions from boreholes and other oil and gas production equipment. This method includes contacting said scale with a three-phase emulsion. The emulsion includes an aqueous external phase and an aqueous internal phase, separated by a liquid hydrocarbon phase. The external phase contains a first chelating or complexing agent and a catalyst selected from anions of weak organic or inorganic acids having ionization constants less than about $10^{-2}$. The hydrocarbon phase is immiscible with the two aqueous phases and it contains a second complexing agent. This complexing agent is capable of forming a complex with one or more of the ions in scale-forming compounds.

Complexes of ions with said first complexing agent are transported in said hydrocarbon phase by a suitable phase transfer agent. An internal aqueous phase is contained in and is immiscible with the hydrocarbon phase. The internal aqueous phase contains a third complexing agent capable of forming a third complex with said scale-forming ions. The strength of the complex of the scale-forming ions and third complexing agent is much greater than the strength of the complex of the scale-forming ions and the first and second complexing agents. Scale-forming ions from scale dissolve quickly into the aqueous external phase. These ions are complexed in the hydrocarbon membrane phase and are then drawn into the aqueous internal phase because of the stronger complexing strength of the third complexing agent. Weak and difficult soluble scales of barium and/or strontium sulfate are removed from borehole perforations and metal surfaces.

It is therefore an object of this invention to provide an efficient and novel way to remove scale from oil and gas production equipment.

It is a further object of this invention to remove intractable barium or strontium sulfate scale, or other similar scale generally found downhole in hydrocarbonaceous fluid producing equipment.

It is therefore another object of this invention to provide for a novel liquid membrane composition for dissolving alkaline earth metal sulfate scale at substantially quicker rates than heretofore possible.

It is still another object of this invention to provide a method of solubilizing barium or strontium sulfate thus enabling the removal of adherent barium and strontium sulfate scales, deposits and crystals from surfaces.

It is yet another object of this invention to provide a liquid membrane composition which will produce substantially higher levels of dissolved barium, strontium, calcium, and other alkaline earth sulfate scale than heretofore possible.

BRIEF DESCRIPTION OF THE DRAWINGS

FIG. 2 is a graph which depicts the free energy of reaction for barium sulfate conversion at 25° C.

DESCRIPTION OF THE PREFERRED EMBODIMENTS

Figure 1A:
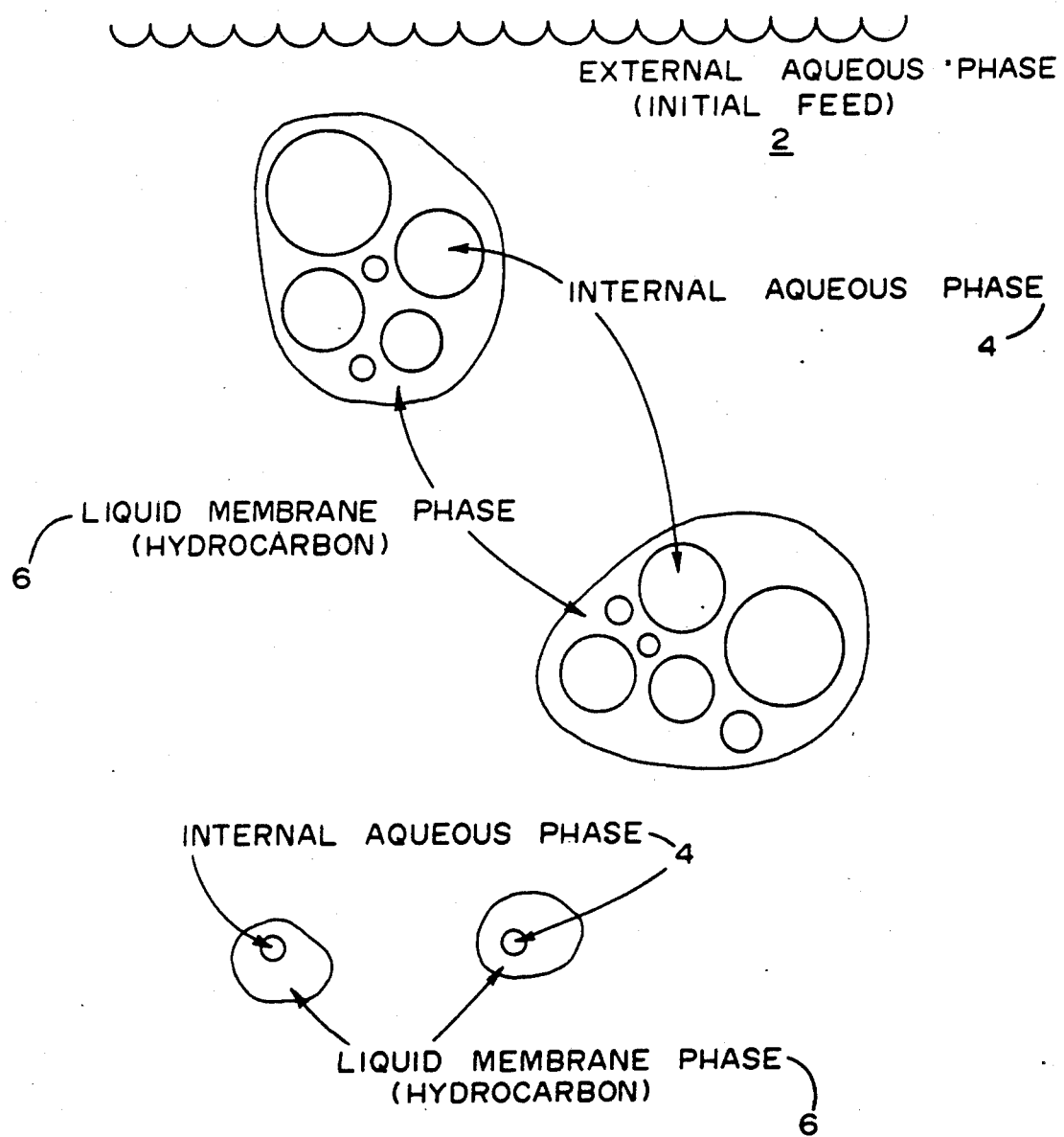
FIG. 1a is a schematic representation of a liquid membrane system.

In the practice of this invention, fluid is removed from a wellbore which contains scale. These fluids can be removed by an inert buffer phase. After removal of the wellbore fluids, an emulsion containing a liquid membrane phase which encases droplets of an internal aqueous phase is mixed with an external aqueous phase and is injected into the wellbore. The internal aqueous phase is thus separated from the external aqueous phase by the hydrocarbon-containing liquid membrane phase. Upon injection into the wellbore, the external aqueous phase bathes and contacts scales deposited in borehole perforations and other areas within the wellbore.

In another embodiment pump, pipes, valves and other production equipment can be removed and placed within a vessel suitable therefor. These parts can then be immersed in an emulsion as discussed above for the removal of scale. A method for scale removal by use of a liquid membrane is disclosed in U.S. Pat. No. 4,621,694, which issued to Wilson et al. on Nov. 11, 1986. This patent is hereby incorporated by reference herein in its entirety.

Once the liquid membrane system has become saturated or has reached its capacity to retain scale-forming ions, the emulsion may be subjected to a deemulsification process to remove the scale-forming ions from the liquid internal aqueous phase and the hydrocarbonaceous liquid membrane phase. Methods for deemulsification of the liquid membrane can be found in U.S. Pat. No. 4,292,181, issued to Li et al. which is hereby incorporated by reference herein.

A wide range of temperatures may be utilized in the process of the instant invention since temperature is not critical. There would, however, be a lower and an upper limit which would be satisfactory for separation with a liquid phase surfactant membrane. The lower temperature should be higher than the freezing temperature of any of the liquids contacted, such as well water. It will also have to be higher than the freezing temperature of the emulsified aqueous mixture so that flow and mass transfer will be facilitated. Typical temperatures vary from above about 0° to about 100° C. or higher depending upon the depth to which the system is injected into the formation. A temperature of about 25° to about 100° C. is preferred.

Upon placement of the emulsified aqueous mixture downhole into a well, temperatures may be encountered substantially above 60° C. Downhole temperatures in a hydrocarbonaceous well can vary from about 15° C. to about 200° C. depending upon the well depth. Temperatures up to about 200° C. will not affect the emulsified aqueous mixture, providing appropriate emulsifying agents are used, as is known to those skilled in the art.

This process provides a novel process for the dissolution of scales, particularly intractable BaSO4 and SrSO4. Referring to the drawing FIG. 1a, a liquid membrane solvent medium for scales encountered in production equipment and wellbores typically consists of an external aqueous phase 2 which bathes said scale. Said external aqueous phase 2 contains an aqueous solution having a pH of from about 8 to about 14, a first chelating or complexing agent, and a catalyst consisting of anions of organic and inorganic acids and mixtures thereof. The complexing agent includes aminocarboxylic acid or polyamines, salts and mixtures thereof. The first complexing agent will have a lower chelating strength than the chelating or complexing agent which will be used in either internal aqueous phase 4 or liquid membrane phase 6.

BaSO4, SrSO4, CaSO4 and CaCO3 are dissolved in the external aqueous phase. $Ba^{++}$, $Sr^{++}$ and $Ca^{++}$ ions are collected in the liquid membrane phase by a chelating agent. Afterwards, said ions diffuse through said liquid membrane into the encased droplets in the internal aqueous phase. These ions continually accumulate in droplets of the internal aqueous phase which contains a third chelating agent. The composition of said second chelating agents is such that the accumulation of said ions is markedly greater than the concentration in said external aqueous phase. Continuous migration of said ions into the external aqueous phase into the liquid membrane phase and into droplets of said internal aqueous phase causes films of scale to be progressively removed from surfaces where they have been deposited.

Complexing agents which are preferred for use herein comprise ethylenediaminetetraacetic acid (EDTA) or diethylenetriaminepentaacetic acid (DTPA) and salts thereof. EDTA and DTPA are preferred to be used in an aqueous solution having a concentration of about 0.1 to about 1.0M.

The scale dissolution ability of the chelant used is substantially enhanced by the addition of a catalyst into the aqueous solution. A catalyst used herein is selected from a member of the group consisting of anions of organic or inorganic acids, and mixtures thereof having an ionization constant of less than about $10^{-2}$ ($K_a < 10^{-2}$). When used in the external aqueous phase, about 80% to about 90% of said scale is solubilized in about 10 minutes when used in combination with EDTA or DTPA. Anions which can be used include oxalate, salicylate, fluoride, persulfate, dithionate, hypochlorite, formate, thio, amino and hydroxy acetate anions. Some of the anions which can be utilized herein are shown in a free energy graph designated FIG. 2. Fluoride ($F^-$) and oxalate ($C_2O_4^=$) anions are the preferred catalysts for EDTA and DTPA, respectively. Salts EDTA and DTPA and mixtures thereof can be used for the dissolution of barium sulfate.

Examples of compounds from which anions can be derived for use as a catalyst herein include potassium fluoride, oxalic acid, salicylate acid, potassium acid tartrate, potassium persulfate, potassium hypochlorite, aminoacetic acid (glycine), glycolic acid (hydroxyacetic acid) and thioglycolic acid (mercaptoacetic acid). The amount of compound used to obtain the catalyst should vary as required to obtain an anion concentration of from about 0.1 to about 0.5 molar.

Experimentally, it was determined that the catalysts alone (without EDTA OR DTPA) have no significant scale dissolution properties of their own. While not desiring to be bound to a particular theory concerning the actual mechanism of this activity in converting or dissolving, it is believed that adsorption of either catalyst on the barium sulfate surface modifies the surface crystal structure in such a way that the barium in the modified crystal is easily removed by the chelating agent.

The effect of cations on scale dissolution is also very important to the success of the scale solvent, especially when added with the sizable portion of caustic required to adjust the pH to 12. Dissolution of the caustic is enhanced as the size of the cation is increased, i.e. lithium, sodium, potassium and cesium. Lithium and sodium hydroxides in the presence of EDTA, or DTPA, and catalysts are not soluble at a pH of 12, the optimum value. Cesium is too difficult to obtain, both in quantity and price. Therefore, potassium hydroxide, in the form of caustic potash, is the preferred pH adjusting reagent.

One example of a preferred aqueous solvent which can be used comprises 0.5M DTPA and 0.3M oxalic acid adjusted to a pH of 12 with potassium hydroxide.

Another example of a preferred aqueous solvent for use herein comprises 0.5M EDTA and 0.5M KF adjusted to a pH of 12 with potassium hydroxide.

Referring to FIG. 1a, internal aqueous phase 4 in the form of droplets contains one or more very strong chelating agents for $Ba^{++}$ and $Sr^{++}$ ions. Aqueous phase 4 can also contain electrolytes. A preferred chelating agent for utilization in internal aqueous phase 4 is 0.5M diethylenetriaminepentaacetic acid (DTPA). Said acid is sold under the HAMP-EX ® trade name by W. R. Grace Co. located in Nashua, N.H. HAMP-EX acid is a chelating or complexing agent for barium and is very slightly soluble in water. This water soluble complexing agent at high pH complexes the barium ion more strongly than does the oil soluble complex used in liquid membrane phase 6. It also draws the barium ions out of the complex in liquid membrane phase 6 and binds them into internal aqueous phase 4.

Liquid membrane phase 6 is a non-aqueous phase, comprised preferably of liquid hydrocarbons which separate the external aqueous phase 2 from internal aqueous phase 4. Separation occurs because said non-aqueous phase forms an envelope around the internal aqueous phase 4. Said envelope contains one or more chelating or complexing agents for $Ba^{++}$ and $Sr^{++}$ which are stronger chelants than in external aqueous phase 2 and weaker than those contained in internal aqueous phase 4. Generally, said liquid hydrocarbon comprises a water-immiscible solvent which may be chosen from the class consisting of hydrocarbons, halogenated hydrocarbons and ethers. The oil component, of course, must be liquid at the conditions at which the instant compositions are used, must be capable of dissolving the particular additives chosen, and also must be capable, in conjunction with the particular additive, of forming a stable water in oil emulsion with the inernal aqueous phase 4.

A method which is suitable for preparing a hydrocarbonaceous liquid membrane is described in U.S. Pat. No. 4,259,189 issued to Li on Mar. 31, 1981, which is hereby incorporated by reference. This patent also describes strengthening agents, additives, surfactants which can be used in the practice of this invention for making liquid membranes. The liquid membrane phase surrounding said internal aqueous phase 4 is composed of a hydrocarbonaceous material. This hydrocarbonaceous material has combined therein a first complexing agent known as for example, tertiary alkyl amine, either in the form of the free amine or the quaternary amine salt. Tertiary alkyl amines are hereinafter referred to as "TBA". ALIQUAT® 336 tricapryl methyl ammonium ion (Br⁻) is one example of a TBA which can be used herein. This TBA can be purchased from General Mills Chemicals, Inc. Many types of alkyl groups can be employed in the TBA as long as they contain a chain of sufficient length to impart oil solubility. TBA is combined with the hydrocarbonaceous liquid which liquid is in an amount sufficient for use in removing scale from oil and gas production.

In order to show the effectiveness of the aqueous solvent, the following tests were conducted. Distilled water was used in the majority of tests for determination of the rate of barium sulfate dissolution and saturation. Some tests were run with Dallas city tap water and synthetic seawater. A minor decrease in efficiency was observed with tap water. About a 20 percent decrease in efficiency was observed when seawater was used. This was expected, since seawater has interfering ions, e.g. calcium and magnesium. These interfering ions complex with the chelating agent, either DTPA or EDTA, and reduce the overall dissolving power. Additionally, it has been determined that halogen ions have a negative effect on dissolving power as a function of the size of the halogen ion. Dissolution rate is increased as the halogen ion size is reduced and the charge density is increased, i.e. in the order of iodide, bromide, chloride and fluoride. Fluoride ion definitely enhances EDTA solvents, but not DTPA: fluoride inhibits most DTPA/catalyst solvents. Therefore, it is necessary that the selected chelating agent show catalytic activity with anions of a selected inorganic or organic acid. Such selection can be made by determining scale dissolution as is set forth in the discussions and data which follow.

In order to test the barium sulfate scale-dissolving capacities of the composition, several aqueous compositions have been demonstrated in laboratory tests described in the discussions which follow. The experiments described below were carried out in a cylindrical glass vessel having a height of 10 cm and an internal diameter of 7.5 cm.

Figure 1B:
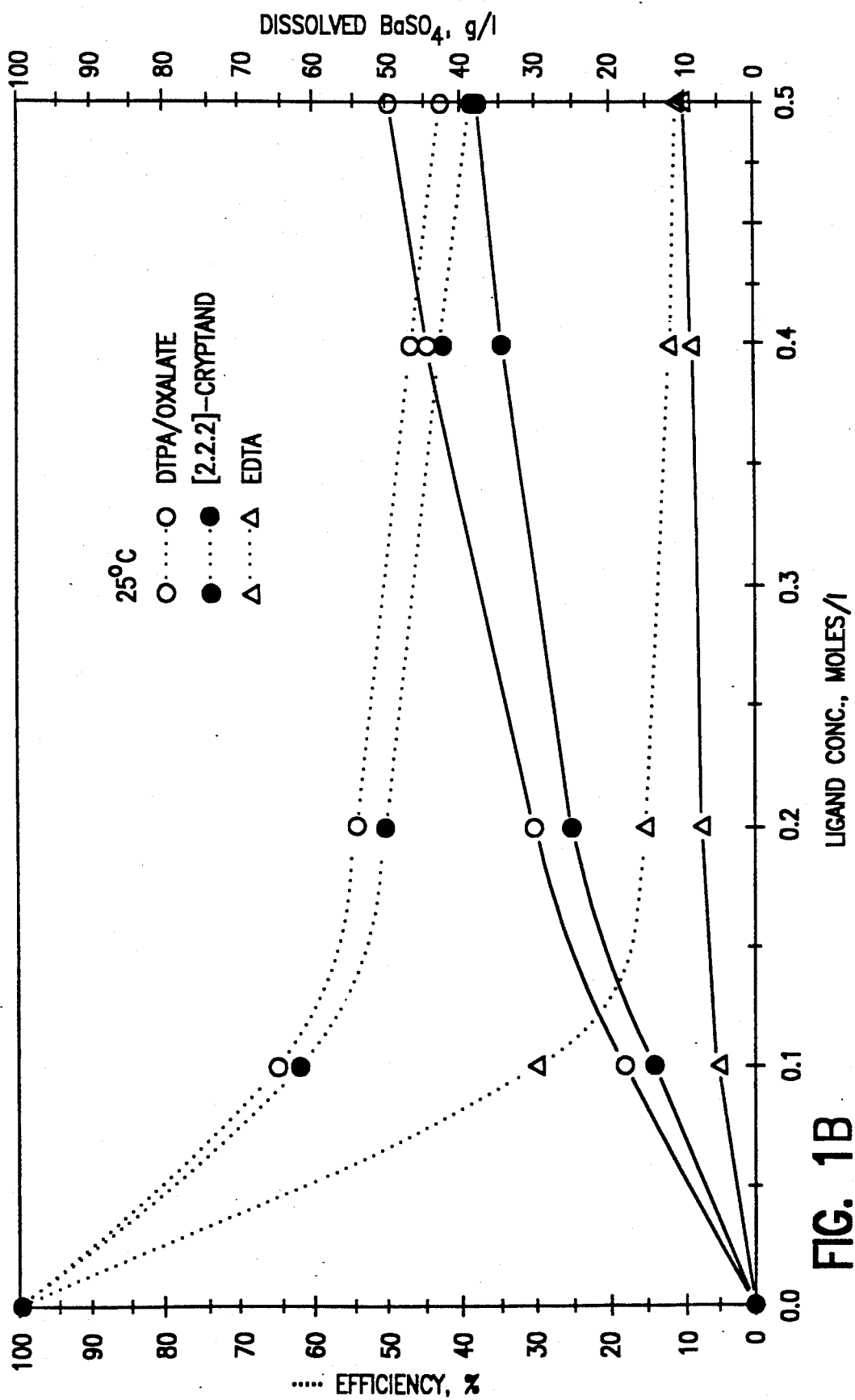
FIG. 1b is a graph which depicts the dissolution efficiency of barium sulfate as a function of ligand concentration.

As shown in FIG. 1, varying concentrations of DTPA and EDTA are compared with 2.2.2-cryptand which is described in U.S. Pat. No. 4,215,000 and which is hereby incorporated by reference herein. As described, various concentrations of DTPA with oxalate and EDTA were compared with the barium sulfate dissolution of 2.2.2-cryptand. The results were obtained at 25° C. and demonstrate that DTPA/oxalate complexes more barium sulfate (49 g/l) than 2.2.2-cryptand (37 g/l). As the dotted lines in the graph reveal, DTPA/oxalate is substantially more efficient than either 2.2.2-cryptand or an EDTA chelant at all concentrations. Efficiency of a chelant or solvent is defined as the fraction of chelant that is complexed with barium divided by the total concentration of chelating agent.

Figure 3:
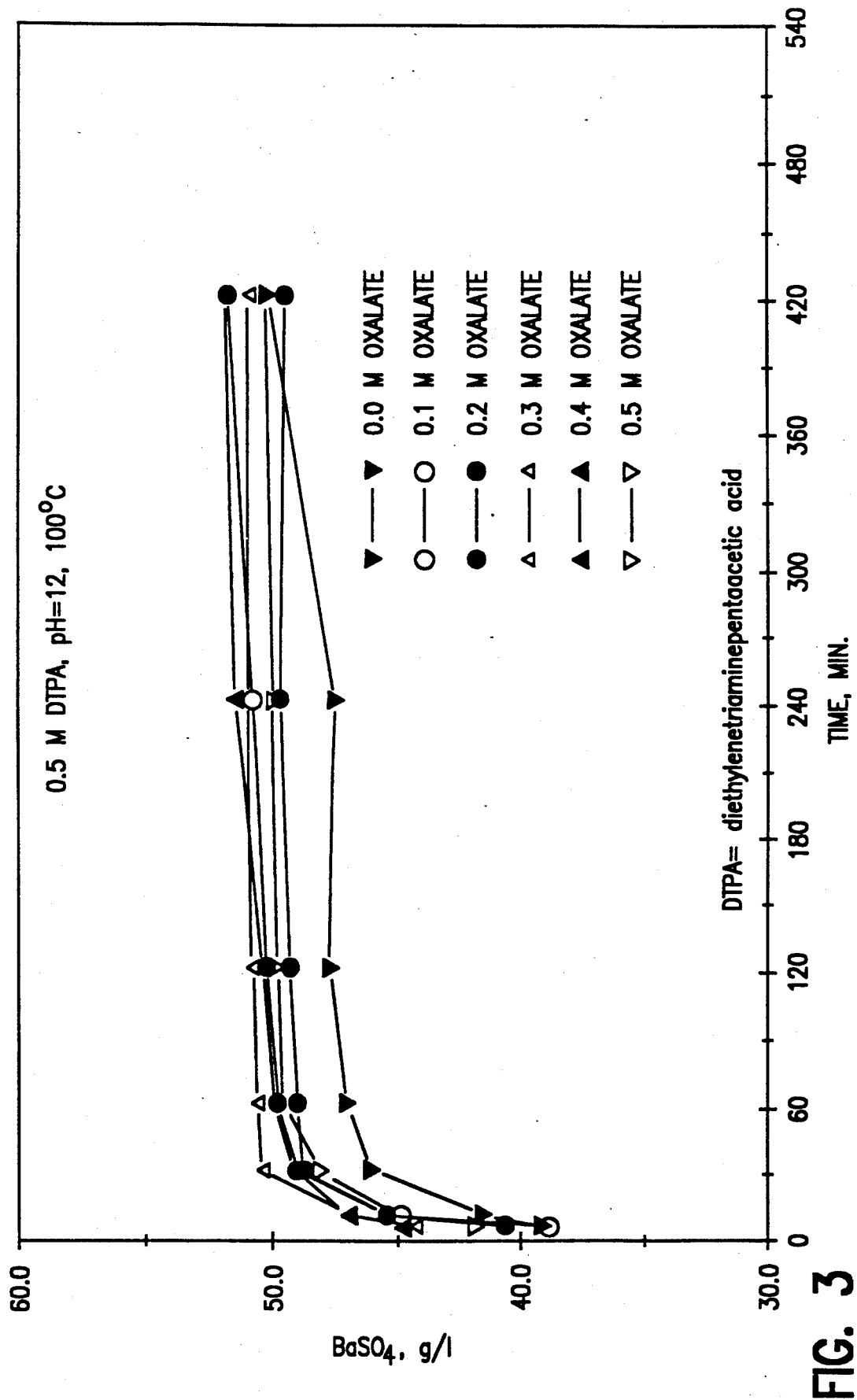
FIG. 3 is a graphical representation of the rate of barium sulfate dissolution in the presence of a solution having a pH of 12, 0.5M DTPA, and varying concentrations of an oxalate catalyst at a temperature of 100° C.

The amount of oxalate catalyst utilized in combination with DTPA is not critical. This is illustrated in FIG. 3 which further indicates that all concentrations of oxalate catalyst from 0.1 to 0.5M contribute to the dissolution of 80 to 90 percent of the saturation level of barium sulfate within ten (10) minutes of contact. Additionally, as demonstrated in FIG. 3, the fast rate of reaction (dissolution) is a novel feature of this invention. Another novel feature of this invention is the high saturation levels of dissolved barium, strontium and calcium sulfate scales which are obtained in the aqueous solution when used in the internal and external phase of the liquid membrane system.

Figure 4:
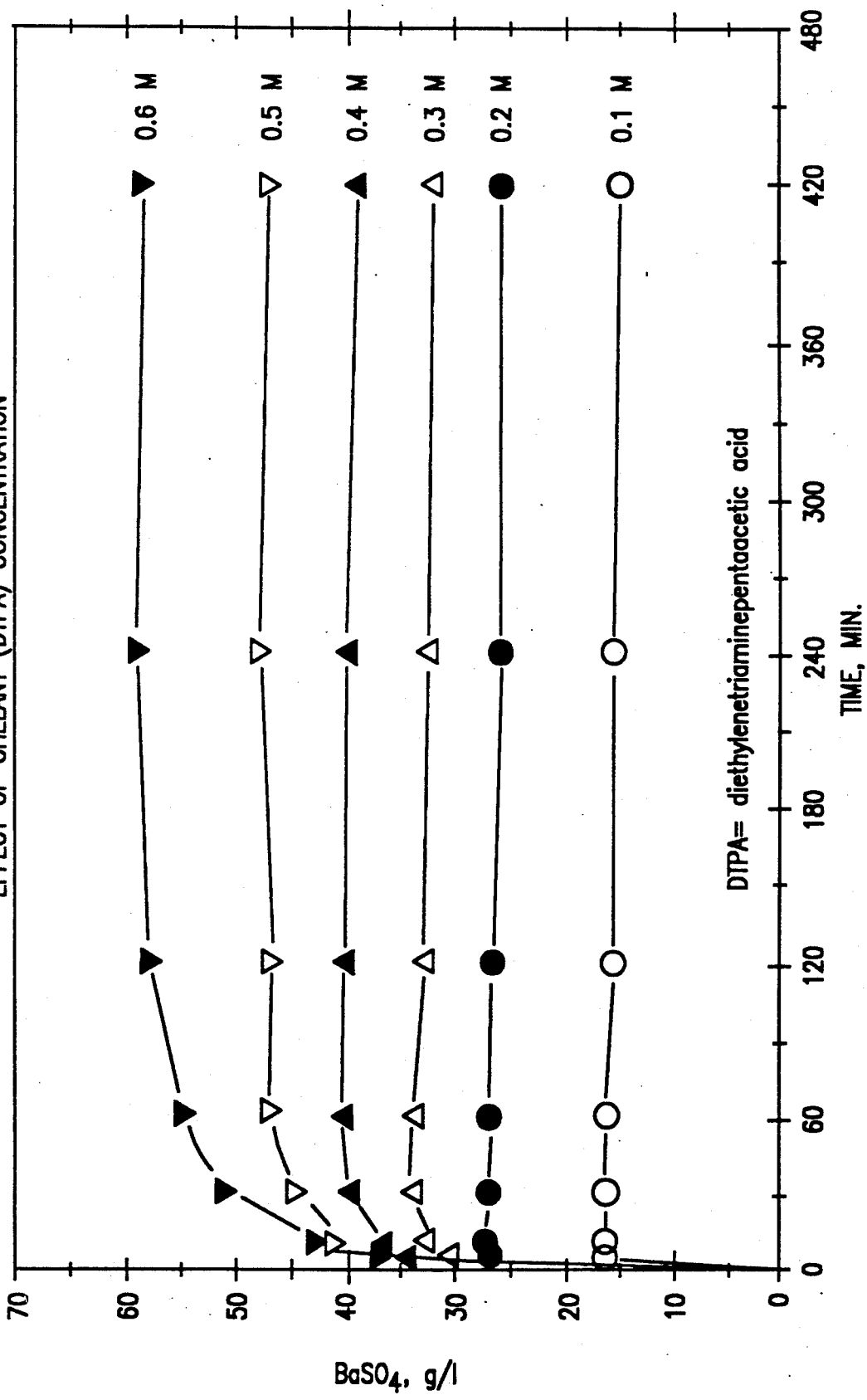
FIG. 4 shows the rate of barium sulfate dissolution in a solution having a pH of 12 and an oxalate catalyst where varying concentrations of DTPA are utilized.

Barium sulfate or other scales dissolved in the solvent are influenced by the concentration of chelant used. The effect of varying the DTPA concentration is depicted in FIG. 4. Increased DTPA concentration causes an increase in the rate of barium sulfate dissolution and the amount of barium sulfate held in the solvent.

Figure 5:
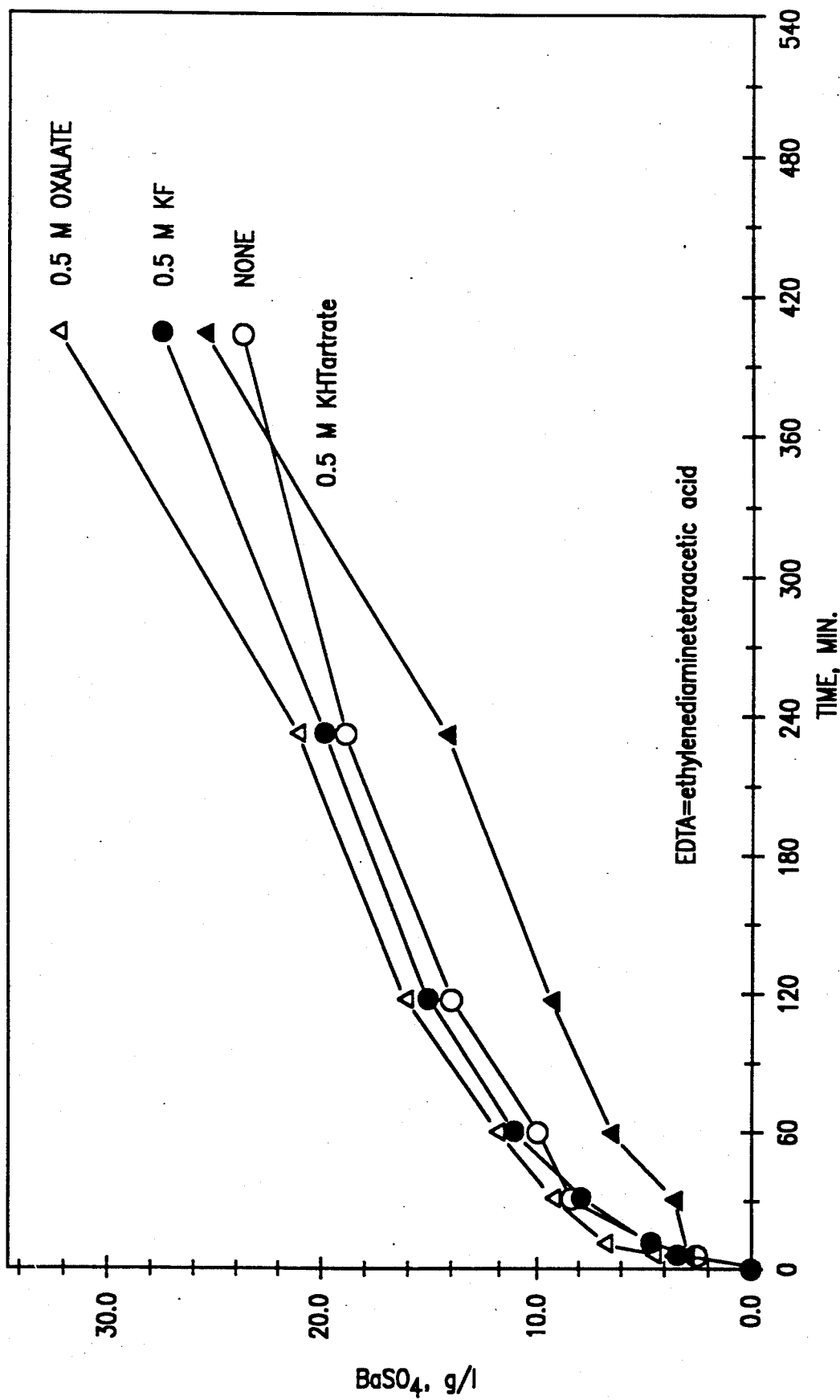
FIG. 5 is a graphical representation of the rate of barium sulfate dissolution in 0.5M EDTA with catalysts of 0.5M oxalate, 0.5M potassium fluoride and 0.5M potassium acid tartrate.
Figure 6:
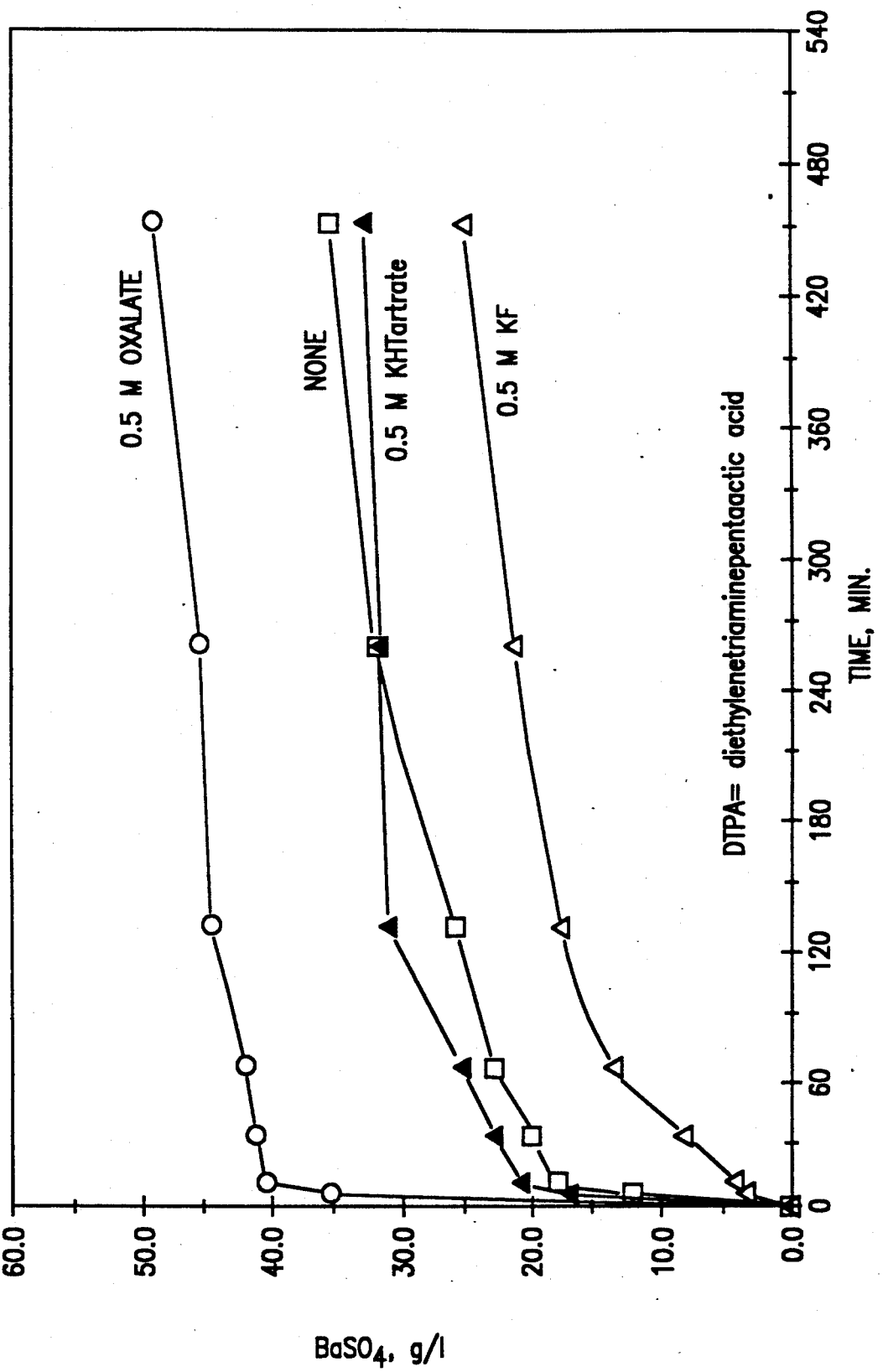
FIG. 6 is a graph depicting the rate of barium sulfate dissolution in 0.5M DTPA with catalysts of 0.5M potassium fluoride, 0.5M oxalate, and 0.5M potassium acid tartrate at 25° C.

FIG. 5 illustrates the rate of barium sulfate dissolution when 0.5M EDTA is used with 0.5M catalysts including oxalate, potassium fluoride and potassium hydrogen tartrate. FIG. 5 also illustrates the barium sulfate dissolution rate when 0.5M EDTA is used alone. The temperature of the solvent in which the catalyst is used affects the rate of barium sulfate or scale dissolution. This is further shown in FIG. 6. Here differences in the barium sulfate or scale dissolution rate of a solvent containing 0.5M DTPA is shown when the temperature is maintained at 100° C. and 25° C. with designated catalysts. These catalysts comprise 0.5M potassium fluoride, 0.5M oxalate and 0.5M potassium acid tartrate.

Figure 7:
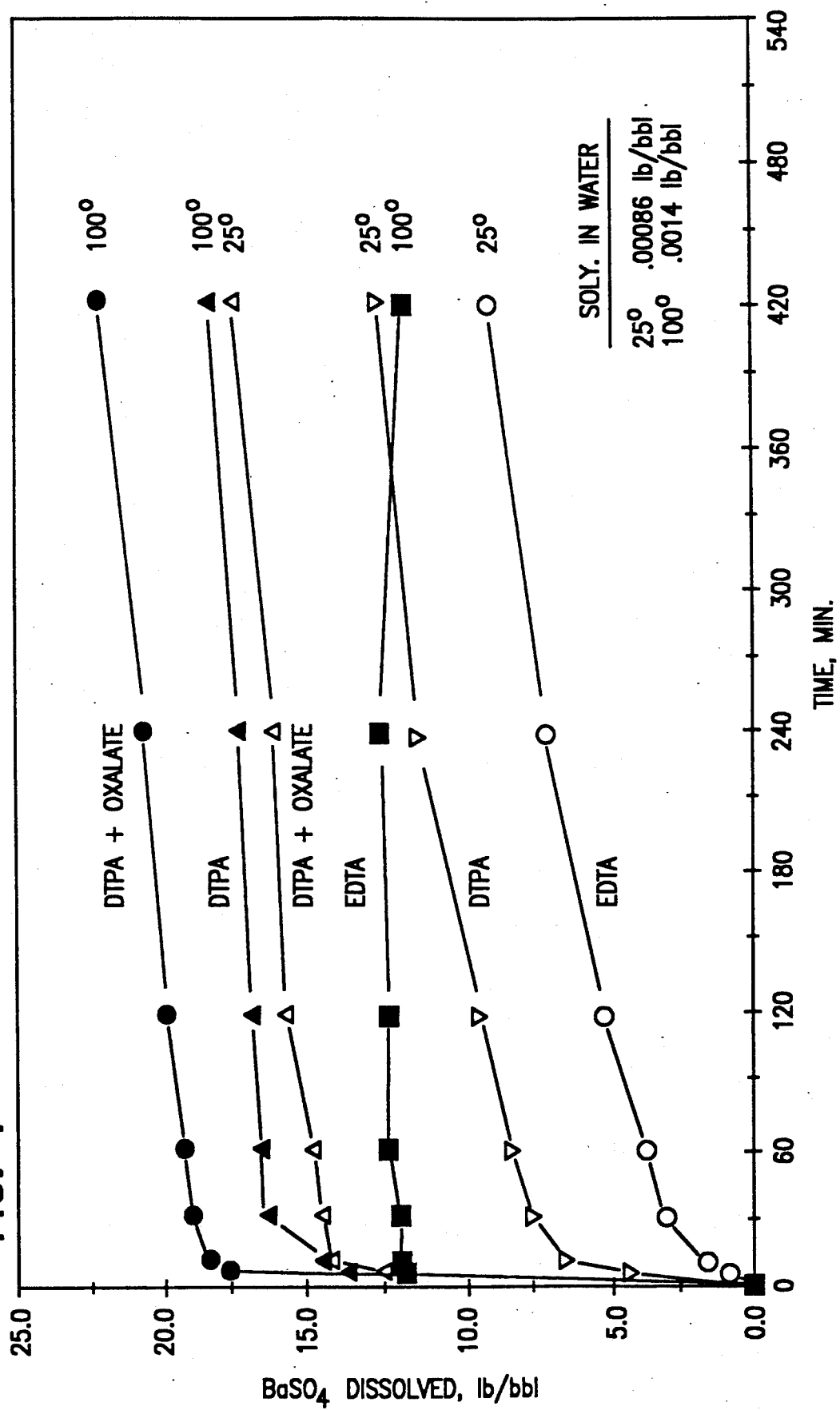
FIG. 7 is a graphical representation of differences in the rate of barium sulfate dissolution by DTPA with and without an oxalate catalyst.

Effectiveness of an oxalate catalyst is shown with DTPA when compared to DTPA alone at 25° C. and 100° C. This is illustrated in FIG. 7. DTPA with oxalate at 25° C. has nearly the same barium sulfate dissolution rate as DTPA only at a temperature of 100° C. Examining FIG. 7, it is readily apparent that the oxalate catalyst caused the difference. This is apparent since the barium sulfate dissolution rate of DTPA with oxalate at 25° C. is much greater than the dissolution rate of barium sulfate by DTPA alone at 25° C. As illustrated in FIG. 7, about 90 percent of the scale is dissolved in the lab within the first ten minutes of contact using powdered BaSO$_4$. Much slower rates of barium sulfate dissolution are shown when EDTA and DTPA are utilized without a catalyst at 25° C.

Figure 8:
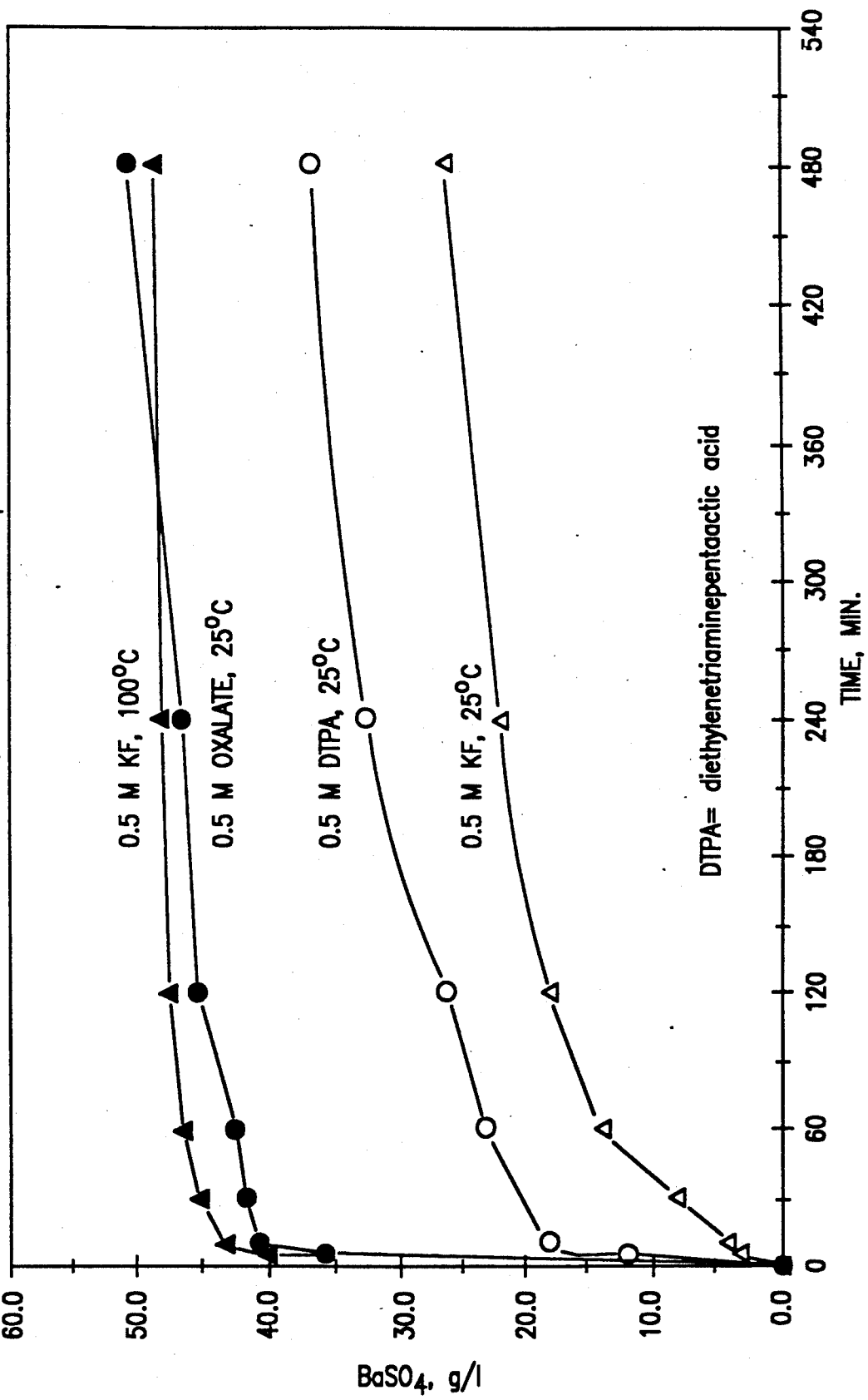
FIG. 8 is a graph which depicts the rate of barium sulfate dissolution in 0.5M DTPA with catalysts of 0.5M potassium fluoride and 0.5M oxalate at various temperatures.

Although catalysts greatly enhance the rate of barium sulfate dissolution by DTPA or EDTA, this enhancement varies with the particular catalyst employed. FIG. 8 illustrates graphically the difference in barium sulfate dissolution when selected catalysts are utilized with DTPA. These catalysts comprise 0.5M potassium fluoride at 100° C. and 25° C., and 0.5M oxalate at 25° C.

As mentioned above, the rate of barium sulfate scale dissolution varies with the solvent composition utilized. In order to determine candidates for use as a solvent, free energy calculations for the conversion of barium sulfate to barium carbonate were utilized. This is a well known conversion using concentrated sodium carbonate solution and solid alkaline earth metal sulfates. Free energy of conversion of barium sulfate to barium carbonate is calculated as essentially zero, meaning that the conversion is energetically favorable. However, the conversion is expected to reach equilibrium with less than full conversion of barium sulfate to barium carbonate. This is the actual reaction situation with only about 75–80 percent of the barium sulfate being converted. Further calculations were made using common anions, both organic and inorganic. Some of the anions considered are shown in FIG. 2 of the free energy graph. Those anions with a negative free energy of reaction are considered very reactive toward conversion of alkaline earth sulfates to the respective barium compounds. Many of the anions are by nature strong oxidizing agents, for example, persulfate ($S_2O_8$), dithionate ($S_2O_6$), and hypochlorite (OCl), normally would not be considered practical for use in a hydrocarbon environment. Fluoride ($F^-$) and oxalate ($C_2O_4^=$) anions are found to be very active catalysts for ethylenediaminetetraacetic acid (EDTA) and diethylenetriaminepentaacetic acid (DTPA) or their salts for dissolution of barium sulfate, respectively.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A liquid membrane method for removing barium sulfate scale from equipment containing same via an emulsion comprising:
   a) contacting said scale-containing equipment with an external aqueous phase which causes said scale to solubilize into scale-forming ions in said external aqueous phase which consists essentially of:
      i) an aqueous solution having a pH of from about 8 to about 14;
      ii) a first complexing agent selected from a member of the group consisting of aminocarboxylic acid or polyamines, salts and mixtures thereof in an amount of at least about 0.1 to about 1.0M; and
      iii) a catalyst in an amount of at least from about 0.01 to about 0.5M selected from a member of the group consisting of fluoride, persulfite, persulfate, dithionate, hypochlorite, formate, salicylate, aminoacetate, glycolate, or thioglycolate anions and mixtures thereof, having an ionization constant of less than about $10^{-2} K_a < 10^{-2}$ which acts with said first complexing agent to substantially enhance said agents ability to solubilize scale;
   b) mixing an emulsion into said external aqueous phase which emulsion contains an immiscible liquid hydrocarbonaceous membrane phase having a second complexing agent for said scale-forming ions therein stronger than said first complexing agent enveloped around droplets of an internal aqueous phase having a stronger third complexing agent for scale-forming ions than said second complexing agent; and
   c) transferring said scale-forming ions from said external aqueous phase into said hydrocarbonaceous membrane phase which ions are then transferred from said hydrocarbonaceous membrane phase into said internal aqueous phase where said ions are accumulated and concentrated which causes scale to be removed from said equipment within a substantially reduced time period than is possible with said first and third complexing agents alone.

2. The method as recited in claim 1 where in step (b) said hydrocarbonaceous membrane phase has tertiary alkyl amines as a second complexing agent.

3. The method as recited in claim 1 where in step (c) said hydrocarbonaceous membrane phase has as a second complexing agent a tertiary alkyl amine which removes scale-forming ions from said external aqueous phase in an amount from about 50 to about 130 times the solubility of barium sulfate and strontium sulfate in water.

4. The method as recited in claim 1 where in step (b) said second complexing agent comprises a tertiary alkyl amine which is mixed with said hydrocarbonaceous membrane phase in about 5.0 volume percent to about 25.0 volume percent.

5. The method as recited in claim 1 where said liquid membrane method is utilized at a temperature from above about 0° C. to about 200° C.

6. The method as recited in claim 1 where the first and third complexing agents comprise ethylenediaminetetraacetic acid (EDTA), diethyleneriaminepentaacetic acid (DTPA), salts of EDTA and DTPA, and mixtures thereof and the catalyst in said external phase comprises fluoride, persulfite, persulfate, dithionate, hypochlorite, formate, salicylate, aminoacetate, glycolate, or thioglycolate anions and mixtures thereof.

7. The method as recited in claim 1 where the pH is obtained by the addition of hydroxides of lithium, sodium, potassium or cesium.

8. The method as recited in claim 1 where in step (b), said third complexing agent comprises EDTA, DTPA, salts of EDTA and DTPA, and mixtures thereof and the catalyst for the external phase comprises fluoride, oxalate, persulfite, persulfate, dithionate, hypochlorite, formate, salicylate, aminoacetate, glycolate, and thioglycolate anions which third complexing agent is of a strength sufficient to transfer the scale-forming ions from said liquid hydrocarbonaceous membrane phase in an amount from about 250 to about 650 times the solubility of said scale-forming ions within the external phase.

9. The method as recited in claim 1 where the first complexing agent comprises about 0.10 to about 0.25M EDTA, the catalyst comprises about 0.10 to about 0.25M fluoride ions; and the third complexing agent comprises about 0.25 to about 0.50M EDTA.

10. The method as cited in claim 1 wherein step a) said external aqueous phase dissolves about 80% to about 90% of said scale in about ten minutes at a temperature of about 100° C. or higher.

11. A liquid membrane method for removing barium sulfate scale contained within wellbores and equipment affixed thereto used in the production of hydrocarbonaceous fluids comprising:
   a) removing hydrocarbonaceous fluids from said wellbore and equipment;
   b) preventing the intrusion of additional hydrocarbonaceous fluids within said wellbore;
   c) placing within said wellbore and equipment an emulsion containing an external aqueous phase and an immiscible liquid hydrocarbonaceous membrane phase enveloped around droplets of an internal aqueous phase;
   d) solubilizing scale into scale-forming ions from said wellbore and equipment via said external aqueous phase which consists essentially of:
      i) an aqueous solution consisting essentially of a pH of from about 8 to about 14;
      ii) a first complexing agent selected from a member of the group consisting of aminocarboxylic acid or polyamines, salts and mixtures thereof in an amount of at least from about 0.1 to about 1.0M; and
      iii) a catalyst in an amount of at least from about 0.01 to about 0.5M selected from a member of the group consisting of flouride, persulfite, persulfate, dithionate, hypochlorite, formate, salicylate, aminoacetate, glycolate, or thioglycolate anions and mixtures thereof, having an ionization constant of less than about $10^{-2} K_a < 10^{-2}$ which acts with said first complexing agent to substantially enhance said agents ability to solubilize scale;

e) transferring said ions from said external aqueous phase into said hydrocarbonaceous membrane phase which contains a second complexing agent for reacting with said scale-forming ions which is stronger than said first complexing agent;

f) transferring and concentrating said scale-forming ions from said hydrocabonaceous membrane phase into said internal aqueous phase which has a stronger third complexing agent than said second complexing agent; and g) transferring said scale-forming ions from said external aqueous phase into said hydrocabonaceous membrane phase which ions are then transferred from said hydrocarbonaceous membrane phase into said internal aqueous phase where said ions are accumulated and concentrated which causes scale to be removed from said equipment and wellbore within a substantially reduced time period than is possible with said first and third complexing agents alone.

12. The method as recited in claim 11 where in step (b) said hydrocarbonaceous membrane phase has as a second complexing agent a tertiary alkyl amine.

13. The method as recited in claim 11 where in step (c) said hydrocarbonaceous membrane phase has as a second complexing agent a tertiary alkyl amine which removes scale-forming ions from said external aqueous phase in an amount from about 50 to about 130 times the solubility of barium sulfate and strontium sulfate in water.

14. The method as recited in claim 11 where in step (b) a tertiary alkyl amine complexing agent is mixed with said hydrocarbonaceous membrane phase in about 5.0 volume percent to about 25.0 volume percent.

15. The method as recited in claim 11 where said liquid membrane method is utilized at a temperature from above about 0° C. to about 200° C.

16. The method as recited in claim 11 where the first and third complexing agents comprise ethylenediaminetetraacetic acid (EDTA), diethylenetriamine pentaacetic acid (DTPA), salts of EDTA and DTPA, and mixtures thereof and the catalyst in said external phase comprises fluoride, persulfite, persulfate, dithionate, hypochlorite, formate, salicylate, aminoacetate, glycolate, or thioglycolate anions and mixtures thereof.

17. The method as recited in claim 11 where the pH is obtained by the addition of hydroxides of lithium, sodium, postassium or cesium.

18. The method as recited in claim 11 where said third complexing agent comprises EDTA, DTPA, salts of EDTA and DTPA, and mixtures thereof and the catalyst for the external phase comprises fluoride, oxalate, persulfite, persulfate, dithionate, hypochlorite, formate, salicylate, aminoacetate, glycolate, and thioglycolate anions which third complexing agent is of a strength sufficient to transfer the scale-forming ions from said liquid hydrocarbonaceous membrane phase in an amount from about 250 to about 650 times the solubility of said scale-forming ions within the external phase.

19. The method as recited in claim 11 where the first complexing agent comprises about 0.10 to about 0.25M EDTA, the catalyst comprises about 0.10 to about 0.25M fluoride ions, and the third complexing agent comprises about 0.25 to about 0.50M EDTA.

20. The method as recited in claim 11 wherein step d) said external aqueous phase dissolves about 80% to about 90% percent of said scale in about ten minutes at a temperature of about 100° C. or higher.

* * * * *